United States Patent [19]

Naruse et al.

[11] Patent Number: 4,751,995

[45] Date of Patent: Jun. 21, 1988

[54] JIG FOR CAR BODY ASSEMBLY

[75] Inventors: Kazuo Naruse, Okazaki; Mikio Kitano; Hideaki Tobita, both of Toyota, all of Japan

[73] Assignee: Toyota Jidosha Kabushiki Kaisha, Toyota, Japan

[21] Appl. No.: 11,841

[22] Filed: Feb. 5, 1987

[30] Foreign Application Priority Data

Feb. 7, 1986 [JP] Japan .................................. 61-25056

[51] Int. Cl.$^4$ ............................................. B65G 21/20
[52] U.S. Cl. ................................ 198/345; 295/281.6; 198/803.01; 228/47; 414/222
[58] Field of Search ............. 414/222; 901/7; 228/47, 228/4.1; 29/281.6; 295/1, 31 R, 34; 198/346.1, 345, 803.01

[56] References Cited

U.S. PATENT DOCUMENTS

| | | | |
|---|---|---|---|
| 1,522,332 | 1/1925 | Schmitz | 295/31 R |
| 4,355,580 | 10/1982 | Scheel | 295/34 X |
| 4,483,476 | 11/1984 | Fujikawa et al. | 228/47 X |
| 4,538,044 | 8/1985 | Kadowaki et al. | 228/47 X |

*Primary Examiner*—Robert J. Spar
*Assistant Examiner*—Donald W. Underwood
*Attorney, Agent, or Firm*—Finnegan, Henderson, Farabow, Garrett and Dunner

[57] ABSTRACT

A jig assembly for a car body including a movable jig unit having a frame with a universal configuration and removable jig members configured exclusively for a distinctive body part; and a fixed station jig unit for positioning and fixing the movable unit. The fixed unit is comprised of an elevator lifter for supporting the frame, reference pins which are provided in the elevation range of the lifter and are inserted into the frame to position the frame in the longitudinal direction, reference blocks for positioning the lower end of the frame, first clamp units for fixing the frame onto the reference blocks, and second clamp units for securing a body part to the jig members.

3 Claims, 4 Drawing Sheets

JIG FOR CAR BODY ASSEMBLY

BACKGROUND OF INVENTION

1. Field of Invention

The present invention relates to an assembly line jig; and more particularly, to a jig used for assembly line production of car bodies.

2. Discussion of Prior Art

A conventional jig for the assembly of a car body is made exclusively for a particular type of automobile; and is in a fixed position on an automobile production line. A body part is first delivered by a transport device, for example, to the jig, which receives such body part; the jig then carries it through an assembly line process, such as welding, for example. Thus, when the manufacture of an automobile is changed from one type to another, or if another type of an automobile is added to the particular car body assembly line process, it is necessary that the jig be substantially changed, which requires a great amount of labor. Moreover, when the overall production line is substantially changed, there is a likelihood of decreased production because of the delay in modifying the jigs.

SUMMARY OF THE INVENTION

Accordingly, it is an object of the present invention to overcome the above mentioned problems and disadvantages of prior art jigs; and to provide a jig for the assembly of a car body, which is capable of being changed to accommodate different types of automobiles.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the jig assembly of the present invention comprises a jig frame having a configuration for supporting any one of a plurality of different types of car bodies; the jig frame includes means for removably mounting in selected positions on the frame a plurality of jig members constructed for retaining a car body of a distinct preselected type; and a fixed station unit, including supporting means configured to support the jig frame, means for varying the vertical height of the supporting means, positioning means for positioning the frame in a predetermined position on the supporting means at times when the supporting means is at a selected vertical height adjacent the jig frame, first clamping means for securing said frame to said supporting means at times when the frame is in the predetermined position and second clamping means for securing a car body of a preselected type to jig members constructed for the car body type at times when the jig members are removably mounted in the frame.

The accompanying drawings, which are incorporated in and constitute a part of this specification, illustrate one preferred embodiment of the invention, and together with the description, serve to explain the principles of the invention.

DESCRIPTION OF THE PREFERRED EMBODIMENT

Figure 1:
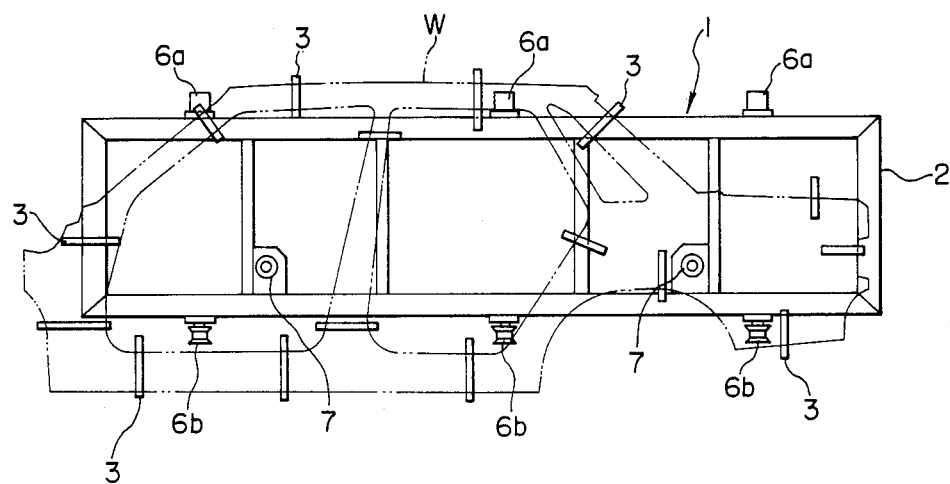
FIG. 1 is a plan view of a movable jig unit portion of a jig assembly for a car body constructed according to the present preferred embodiment of the invention.
Figure 2:
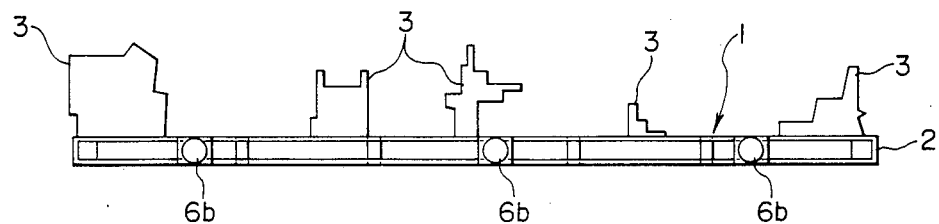
FIG. 2 is a view in side elevation of the movable jig unit of FIG. 1, illustrating a plurality of removable retaining members therein.

An embodiment of the present invention will be described hereinafter with reference to the accompanying drawings. Referring to FIGS. 1 to 6, the reference numeral 1 denotes a movable jig unit, which is substantially comprised of a rectangular frame 2 and a plurality of jig members 3 removably mounted to protrude from frame 2. Jig members 3 are made exclusively for a body part, such as W; and are removably mounted on frame 2 for retaining in position body part W, which is a side member, in this example. Movable jig unit 1 is provided with rollers 6a and 6b on the side surfaces of frame 2 so as to travel on rails 5a and 5b (FIG. 3) supported above a floor 4. As shown in FIG. 1, reference holes 7 for receiving reference pins, hereinafter described, are provided at separate positions from the central portion of frame 2.

Figure 3:
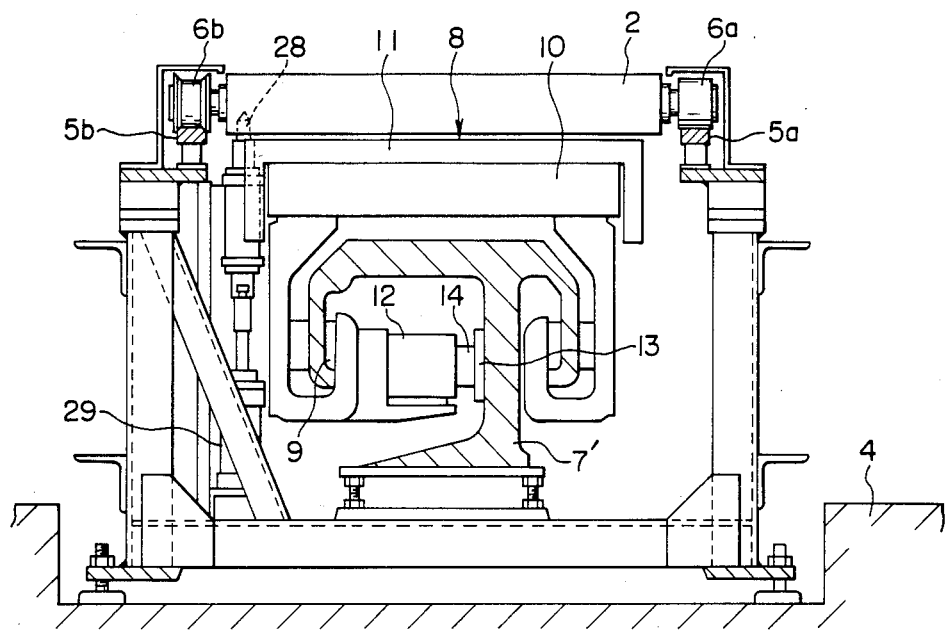
FIG. 3 is a view in elevation of the movable jig unit of FIGS. 1 and 2 illustrating partly in cross section a conveyor for moving the movable jig unit.

Frame 2 is made of a thin walled steel plate, and has few beams so that it slightly deflects when body part W is mounted thereon. Rollers 6b of the rollers 6a and 6b are formed into a truncated V shape; and rail 5b, which engages rollers 6b, is formed with a truncated inverted V shape cross section to mate therewith, as shown in FIG. 3, to prevent derailment. Movable jig unit 1 is carried by a traveling truck 8 (FIG. 3), which travels on a rail 7' mounted between rails 5a and 5b. Traveling truck 8 is comprised of a trestle 10 supported above rail 7' by a roller unit 9 so as to be able to freely travel along rail 7'. A traction support 11, which rests on trestle 10, has a claw, which is freely raised and lowered for holding frame 2, a motor 12, which is provided with reduction gears, and a collector 14 for conducting electricity from a feeder plate 13 disposed along rail 7'.

Figure 4:
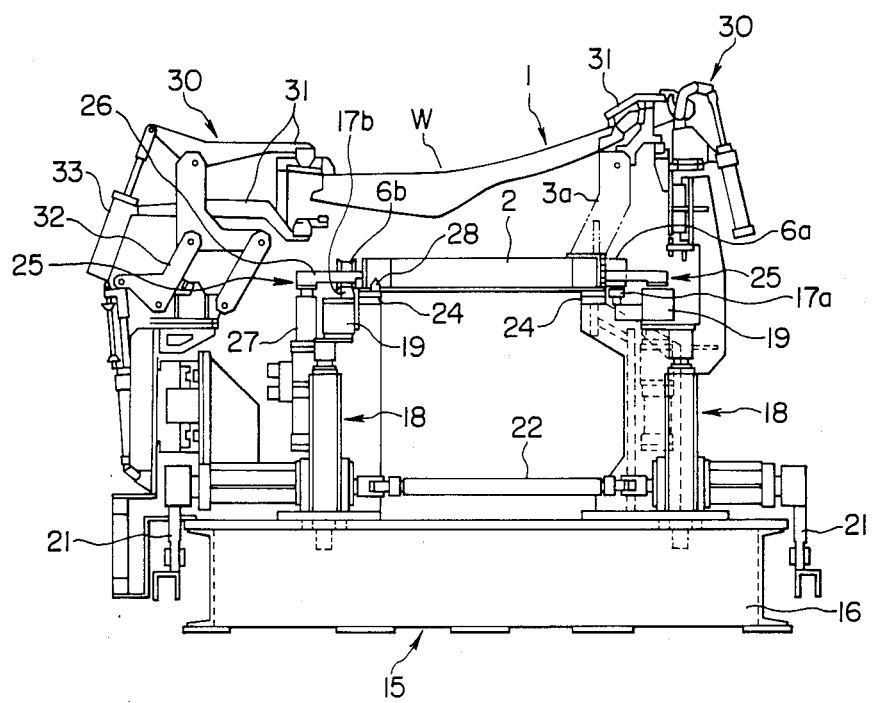
FIG. 4 is a view in elevation of a fixed jig unit portion of a jig assembly showing its relationship with the movable portion of the jig assembly according to the principles of the present invention.
Figure 5:
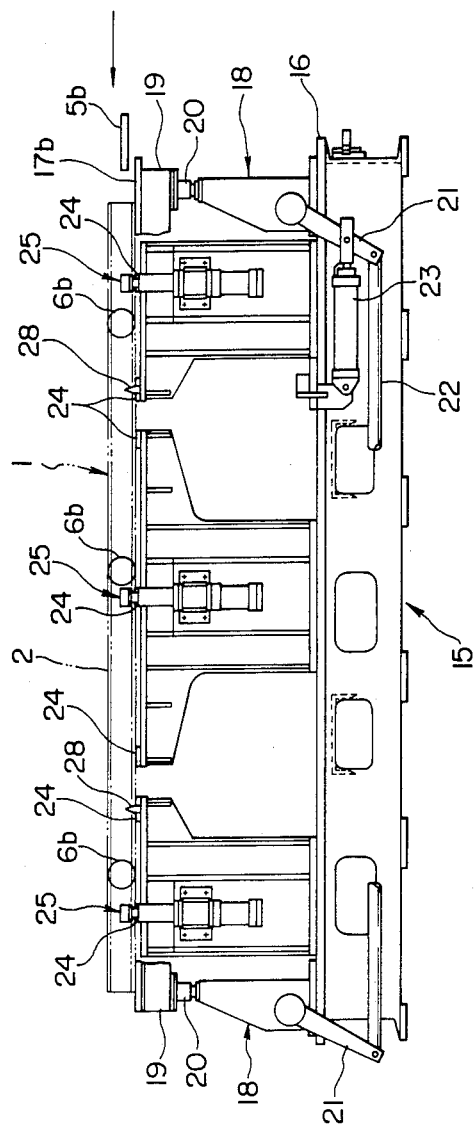
FIG. 5 is a side view in elevation of the fixed jig unit of FIG. 4.
Figure 6:
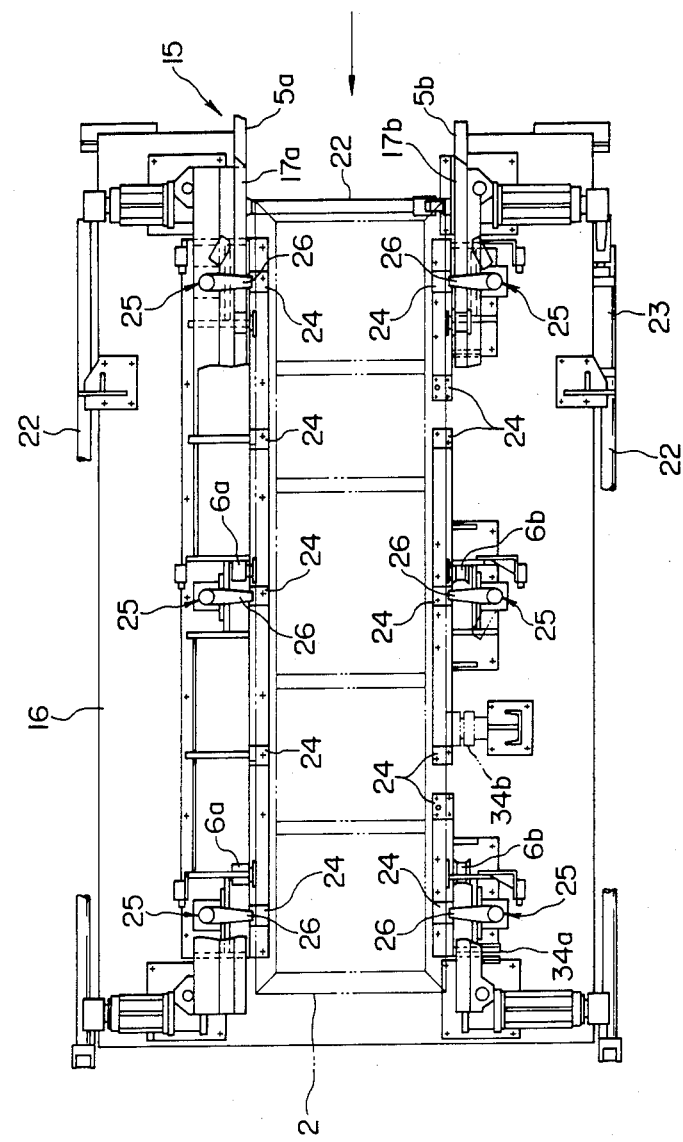
FIG. 6 is a plan view of the fixed jig unit of FIGS. 4 and 5 illustrating the frame of the movable jig unit of FIG. 1 in phantom, in accordance with the teachings of the present invention.

A fixed jig unit 15 for fixing movable jig unit 1 in position, is provided along the path of travel of jig unit 1, as shown in FIGS. 4, 5, and 6. Lifters or jacks 18 having rails 17a and 17b, which correspond to rails 5a and 5b, respectively, are provided on a surface plate 16 of fixed jig unit 15. Lifters 18, which are at four spaced positions on surface plate 16, each have a vertically adjustable main support member 20. Trestles 19 are supported by support members 20 for directly supporting rails 17a and 17b. Links 21 and bars 22 (see FIGS. 4, 5, and 6) connect all four lifters 18 for operating together all four movable support members 20. A cylinder 23 has a movable rod connected to one of links 21 (see FIG. 5) for elevating rails 17a and 17b through vertically adjustable support members 20 and trestles 19. Lifters 18, which have a built in rack and pinion mechanism convert the rotation of link 21 into vertical movement of main support members 20. Movable jig unit 1, which has been pulled by traveling truck 8 (see FIG. 3) over rails 5a and 5b, can move onto rails 17a and 17b on lifters 18 supported on surface plate 16. The movable unit is elevated or lowered by the lifter support members or bodies 20, which are adjusted vertically by vertical movement of the rod of cylinder assembly 23. Reference blocks 24 are provided on surface plate 16 for supporting frame 2, which is lowered onto blocks 24 by lifter 18. First clamp units 25 are provided for fixing frame 2 on reference blocks 24. First clamp unit 25 is comprised of a clamp arm 26, which is rotatable and vertically movable, and a driving device 27 for operating clamp arm 26 to fix frame 2 on reference blocks 24. At this time, frame 2, having a flexible structure, is straightened and positioned vertically. Reference pins 28, which are adapted to be inserted vertically in previously mentioned reference holes 7 of frame 2, are controllable by a cylinder 29 (see FIG. 3) mounted on surface plate 16. When frame 2 is lowered by lifters 18, reference pins 28, as controlled by cylinder 29, are inserted into reference holes 7, thereby positioning frame 2 in a longitudinal direction.

Second clamp units 30 are disposed on surface plate 16 for securing body part W on movable unit 1, after being positioned and fixed on reference blocks 24. Each second clamp unit 30 is comprised of a finger 31 for engaging body part W, a link mechanism 32 for transmitting the driving force to fingers 31 from a cylinder mechanism 33, which serves as the driving force to driving means 34a and 34b (FIG. 6). As shown in FIG. 4, clamping finger 31, clamps body part W to jig member 3a, which is removably part of frame 2 as previously mentioned in connection with members 3 of FIG. 2.

The operation of the jig assembly having the above described structure will now be described. Movable jig unit 1 is used for the sub-assembly of a side member of the body of an automobile; and fixed jig unit 15 is disposed at a welding station. A welding machine (not shown), or an industrial robot is provided adjacent fixed jig unit 15. Traveling rails 5a and 5b for movable jig unit 1, and traveling rail 7' for traveling truck 8 may be formed, for example, in a loop configuration; and a plurality of movable jig units 1 are placed on rails 5a and 5b.

In the above arrangement, body part W is first mounted on jig members 3 of frame 2 (see FIG. 1); and movable jig unit 1 is carried onto fixed jig unit 15 by traveling truck 8 (FIG. 3). As soon as movable jig unit 1 is positioned onto fixed jig unit 15, traveling truck 8 is released. In positioning frame 2 of movable jig unit 1 on fixed jig unit 15, it is first placed on rails 17a and 17b; and then next placed on reference blocks 24 upon lowering of lifters 18 which at the same time permits reference pins 28 to be inserted into reference holes 7', for positioning frame 2 in the longitudinal direction.

First clamp units 25 are then actuated; and frame 2 is secured on reference blocks 24 by clamp arms 26. Since the frame has a flexible structure, clamp arms 26 also serve to correct or straighten frame 2. Second clamp units 30 are next actuated, thereby fixing or securing body part W to jig members 3. Thus, body part W is now ready for welding by a welding machine (not shown) to another body part transported to body part W. After completion of welding of body part W second clamp units 30 and first clamp units 25 are operated to release frame 2. Lifter 18 is next elevated to the position at which traveling rail surfaces 17a and 17b meet or join rail surfaces 5a and 5b of movable jig unit 1. At this time, the assembled body part is transported out of the station or system by another conveying means. Simultaneously, the next movable jig unit is conveyed to fixed jig unit 15 by traveling truck 8.

With the jig assembly of the present invention, a change in the type of automobile to be assembled can be accommodated merely by replacing jig members 3 on frame 2, which greatly improves the efficiency in the preparation of the jig. Since frame 2 is firmly fixed on reference blocks 24 in fixed jig unit 15 by first clamp units 25, the weight of the frame can be reduced and the structure of the frame made flexible, thereby facilitating the conveyance of movable jig unit 1. Furthermore, since movable unit 1 is carried only during movement in a forward direction, there is no need for a complicated device, such as a transfer apparatus. This reduces equipment cost and the number of conveying cycles.

Although lifter 18 is described as being vertically moved by a rack and pinion mechanism in this embodiment, such mechanism may be replaced by a cam mechanism. It is understood that, although a combination of cylinder 23, links 21, bars 22, etc. is used as a driving means for lifters 18, a motor and gear mechanism may replace such combination.

Although a side member of a body part is illustrated in connection with this embodiment of the invention, it is understood that the present invention is suitable for other body parts, such as an under body, a roof, a cowl, or an upper back.

As described above in detail, and in accordance with the present invention, the jig is separated into a universal or common portion and an exclusive portion; and since the exclusive portion constitutes a minor part, it is possible to accomodate a change in the type of automobile, by merely replacing the exclusive portion. This greatly increases the efficiency in preparing the jig. In addition, since the jig is separated into a movable portion and a fixed portion; and the fixed portion is provided with the fixing or securing means for positioning and securing the movable portion to the fixed portion, it is possible to reduce the weight of the movable portion; and to make the structure of the movable portion flexible, thereby increasing the conveying efficiency.

While there has been described what is at present considered to be a preferred embodiment of the invention, other embodiments of the invention will be apparent to the skilled in the art from consideration of the specification and practice of the invention disclosed herein. It is intended that the specification and examples be considered as exemplary only, with the true scope and spirit of the invention being indicated by the following claims and their equivalents.

What we claim is:
1. A jig assembly for a car body assembly line, comprising:
   a. a jig frame, including a plurality of rollers disposed on each side thereof, having a configuration for supporting any one of a plurality of different types of car bodies, said jig frame including means for removeably mounting in selected positions one said frame a plurality of jig members constructed for retaining a car body of a distinct preselected type;

b. a fixed station unit, including
- supporting means including spaced parallel tracks for supporting the plurality of rollers,
- a plurality of lifters disposed adjacent respective ends of said spaced parallel tracks, and
- means for operating said lifters in unison for varying the vertical height of said tracks and maintaining said spaced parallel tracks in a selected horizontal position;

c. positioning means for positioning said frame in a predetermined position on said supporting means at times when said spaced parallel tracks are at a selected vertical height adjacent said jig frame, said positioning means including
- at least one reference block registering with the frame at a predetermined reference position on the frame, and
- at least one reference pin disposed to protude through the frame at a predetermined location at times when said frame is in registry with the reference blocks to to fix the longitudinal position of said frame on the supporting means, said frame being constructed to exhibit flexibility during said registry;

d. first clamping means, mounted adjacent said tracks and engaging opposite sides of the frame, for flexing said frame to draw said sides into engagement with said supporting means;

e. second clamping means for securing a car body of a preselected type to jig members constucted for said car body type at times when said jig members are removably mounted in said frame; and f. transport means for carrying said frame in a forward direction toward said fixed station unit adjacent said supporting means, said transport means being constituted to move in said forward direction away from said fixed jig station subsequent to said frame being positioned by said positioning means.

2. A jig assembly according to claim 1 wherein at least the plurality of rollers on one side of the frame have a truncated V-shape configuration in cross-section for maintaining said frame laterally on said tracks.

3. A jig assembly according to claim 1 wherein the second clamping means are disposed laterally of the frame and spaced therefrom on opposite sides thereof, said second clamping means including fingers extending inwardly with ends to engage a body part for urging said part into contact with a respective one of said jig members at times when said frame is clamped by said first clamping means.

* * * * *